United States Patent
Koehl et al.

(10) Patent No.: US 8,056,037 B2
(45) Date of Patent: Nov. 8, 2011

(54) METHOD FOR VALIDATING LOGICAL FUNCTION AND TIMING BEHAVIOR OF A DIGITAL CIRCUIT DECISION

(75) Inventors: Juergen Koehl, Weil im Schoenbuch (DE); Walter Pietschmann, Horb-Bittelbronn (DE); Juergen Saalmueller, Boeblingen (DE); Norbert Schumacher, Neuhausen (DE); Volker Urban, Boeblingen (DE); Joerg Walter, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 12/233,169

(22) Filed: Sep. 18, 2008

(65) Prior Publication Data

US 2009/0083684 A1    Mar. 26, 2009

(30) Foreign Application Priority Data

Sep. 24, 2007    (EP) .................................... 07117074

(51) Int. Cl.
*G06F 17/50*    (2006.01)
(52) U.S. Cl. ......... 716/113; 716/104; 716/106; 716/108
(58) Field of Classification Search .................. 716/104, 716/106, 108, 113
See application file for complete search history.

(56) References Cited

U.S. PATENT DOCUMENTS

| | | | | |
|---|---|---|---|---|
| 5,555,201 A | * | 9/1996 | Dangelo et al. | 716/102 |
| 5,801,958 A | * | 9/1998 | Dangelo et al. | 716/102 |
| 5,812,416 A | * | 9/1998 | Gupte et al. | 716/105 |
| 7,350,180 B1 | * | 3/2008 | Slavin | 716/103 |
| 7,653,849 B1 | * | 1/2010 | Tabatabaei | 714/726 |
| 7,779,319 B1 | * | 8/2010 | Tabatabaei | 714/726 |
| 7,890,901 B2 | * | 2/2011 | Gemmeke et al. | 716/106 |

* cited by examiner

*Primary Examiner* — Sun Lin
(74) *Attorney, Agent, or Firm* — Yee & Associates, P.C.; Cynthia G. Seal

(57) ABSTRACT

The present invention relates to a method for validating the correct logical function and timing behavior of a digital circuit design within a cycle-based verification environment. The method comprises the steps of providing a VHDL description of the digital circuit design, performing a logic synthesis, wherein the VHDL description is turned into a design implementation in terms of logic gates, and creating a netlist including the elements of the digital circuit design and the connections between said elements. The method comprises the further steps of providing a transformation script with at least one transparent storage element, wherein said transparent storage element represents a path delay within the digital circuit design, creating a new netlist with the at least one transparent storage elements, running a verification, and checking if the new netlist is clean from a logical and timing point of view.

12 Claims, 4 Drawing Sheets

METHOD FOR VALIDATING LOGICAL FUNCTION AND TIMING BEHAVIOR OF A DIGITAL CIRCUIT DECISION

BACKGROUND OF THE INVENTION

1. Field of the Invention

The present invention relates to a method for validating the correct logical function and timing behavior of a digital circuit design within a cycle-based verification environment.

2. Description of the Related Art

In the development of a digital circuit design a simulation process is performed in order to verify the correct logical function and timing behavior. It is very important, that the model of the digital circuit design comprises correct runtimes of the signals. The simulation process may be performed by the support of an appropriate hardware and/or software.

According to the prior art the principle for validating the correct logical function and timing behavior of a circuit design comprises substantially the three following parts. In a first part only the logical function of said digital circuit design is validated. In a second part the timing behavior of said digital circuit design is validated. A timing analysis is performed in a third part. The functional validation on the one hand and the timing validation on the other hand are completely independent from each other.

FIG. 6 illustrates a flow chart diagram of a method for validating the logical function according to the prior art. The shown method refers to an RTL (Register Transfer Level) description, for example as a netlist description. In a first step 10 a model of a desired digital circuit design is provided. Said model is written in a Very High Speed Integrated Circuit hardware description language (VHDL). In a second step 12 a logic synthesis is performed. By this logic synthesis the abstract form of the digital circuit design is turned into a design implementation in terms of logic gates. The logic synthesis uses first assertions 24.

In a next step 14 a netlist is created. The netlist includes the elements of the digital circuit design and the connections between said elements. In particular, the netlist contains the information of those storage elements, which are provided for the real hardware. During a further step 16 a timing analysis is performed. The timing analysis uses second assertions 26. The result is checked in a step 17. If the result is not OK, then the method returns back to step 10 again. If the result is OK, then in a step 18 is shown that the netlist is clean from a timing point of view.

The steps 10, 12, 14, 16, 17 and 18 are used for the timing driven synthesis, the timing analysis and the release.

In a next step 20 a verification of the digital circuit design is performed. In the verification of step 20 the VHDL from the step 10 and the netlist from step 14 are used. The result is checked in a step 21. If the result is OK, then in a step 22 is shown that the netlist is clean from a logical and timing point of view.

The steps 10, 12, 14, 16, 17, 18, 20, 21 and 22 are used for the verification of RTL design description.

The logical function of the digital circuit design is validated within a cycle based environment on the basis of the RTL design description.

This approach according to the prior art has the disadvantage, that the timing assertions are not validated. Therefore timing problems could still exist and must be solved by a new release.

OBJECT OF THE INVENTION

It is an object of the present invention to provide an improved method for validating the correct logical function and timing behavior of a digital circuit design within a cycle-based verification environment.

SUMMARY OF THE INVENTION

The above object is achieved by a method as laid out in the independent claims. Further advantageous embodiments of the present invention are described in the dependent claims and are taught in the description below.

The advantages of the invention are achieved by inserting a number of transparent storage elements for the simulation process. Said transparent storage elements generate delays of the runtimes for the signals. The transparent storage elements are inserted only for the simulation process, but are not arranged in the real hardware. However, in the proper simulation process the inserted storage elements are not transparent and are recognized by the system.

The transparent storage elements may represent a path delay between two or more storage elements and/or a path delay of a combinatorial logic circuit.

The number of the inserted transparent storage elements depends on the timing assertions to be verified. The runtimes of the signals may be represented during the logic simulation. Thus, any corresponding violations of timing assertions may be recognized already in the simulation process. It is not required that the test cases have to be adapted for the verification of the timing assertions.

The present invention allows validating timing constraints of a digital circuit design within a cycle based verification environment.

In a preferred embodiment of the present invention a tools flow is provided in order to perform the transformation automatically. By the inventive method major timing assertions may be modeled and checked via verification.

BRIEF DESCRIPTION OF THE DRAWINGS

The above as well as additional objectives, features and advantages of the present invention will be apparent in the following detailed written description.

The novel and inventive features believed characteristics of the invention are set forth in the appended claims. The invention itself, their preferred embodiments and advantages thereof will be best understood by reference to the following detailed description of preferred embodiments in conjunction with the accompanied drawings, wherein:

DETAILED DESCRIPTION OF THE INVENTION

Figure 1:
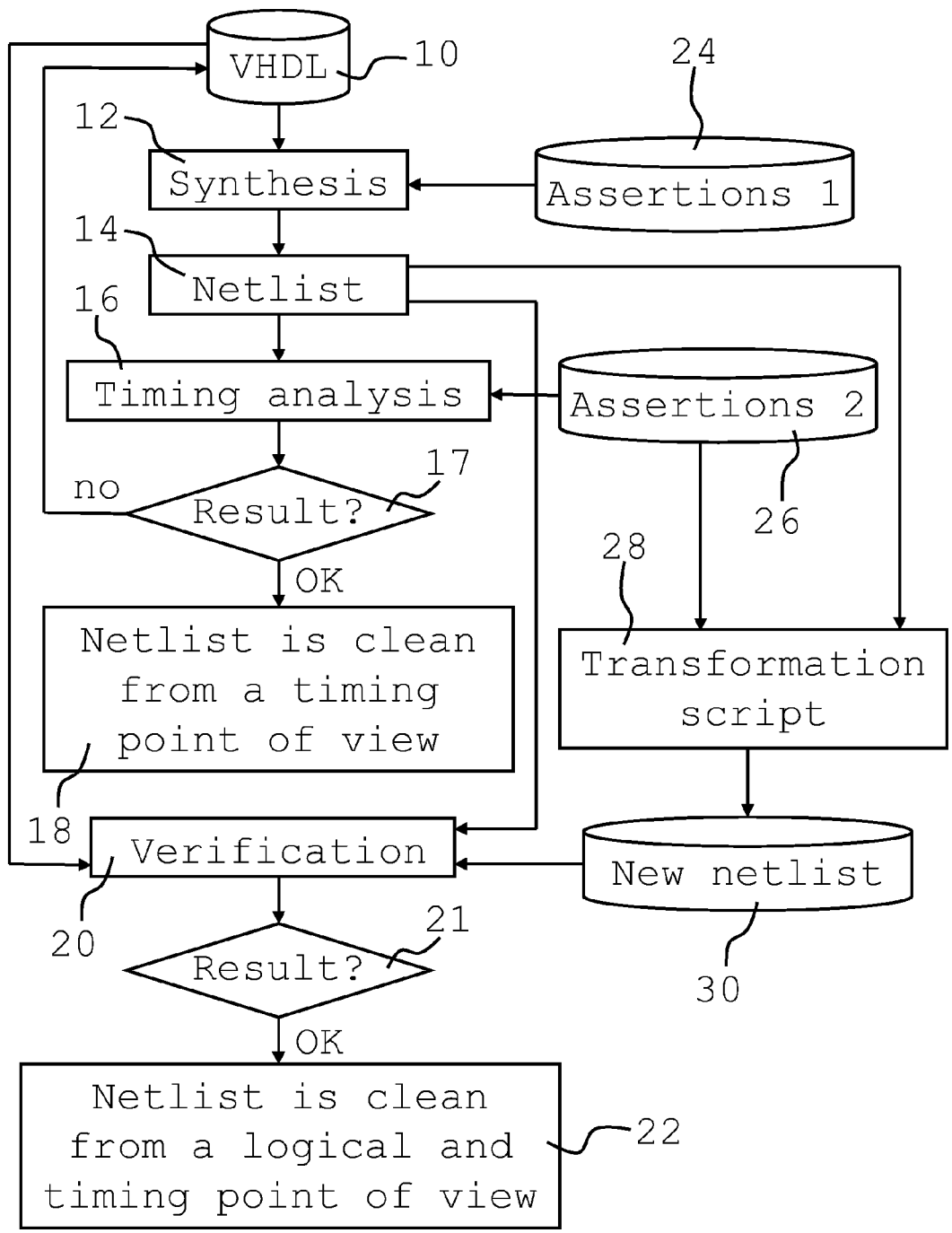
FIG. 1 illustrates a flowchart diagram of a method according to a preferred embodiment of the present invention.

FIG. 1 illustrates a flowchart diagram of a method according to a preferred embodiment of the present invention. In a first step 10 a model of a desired digital circuit design is provided. Said model is written in a very high speed integrated circuit hardware description language (VHDL). In a second step 12 a logic synthesis is performed. By this logic synthesis the abstract form of the digital circuit design is turned into a design implementation in terms of logic gates. The logic synthesis uses first assertions 24. In the logic synthesis an RTL design description is created. The logic synthesis uses assertions 24.

In a next step 14 a netlist is created. The netlist includes the elements of the digital circuit design and the connections between said elements. In particular, the netlist contains the information of those storage elements, which are provided for the real hardware. During a further step 16 a timing analysis is performed. The timing analysis uses second assertions 26. The result is checked in a step 17. If the result is not OK, then the method returns back to step 10 again. If the result is OK, then in a step 18 is shown that the netlist is clean from a timing point of view.

The steps 10, 12, 14, 16, 17 and 18 are used for the timing driven synthesis, the timing analysis and the release.

In a step 28 a transformation script is created on the basis of the netlist from the step 14 and the second assertions 26. For example, the assertions "don't care", "multi cycle" and "adjust" could be transformed. By the transformation transparent storage elements are introduced. The required number of said transparent storage elements depends on the multi cycle values, the adjust values, the cycle times and the best guesses. The transformation will be applied to internal paths between the storage elements. The transformation will be further applied to off-chip-nets.

By the transformation script from the step 28 a new netlist is created in a step 30. The new netlist contains the transparent storage elements. The transparent storage element delays the signal by one clock cycle. The delay of the transparent storage element corresponds with the path delay of a combinatorial logic circuit.

In a next step 20 a verification of the digital circuit design is running. In the verification of step 20 the VHDL from the step 10 and the netlist from step 14 and from step 28 are used. The result is checked in a step 21. If the result is OK, then in a step 22 is shown that the netlist is clean from a logical and timing point of view.

The steps 10, 12, 14, 16, 17, 18, 20, 21 and 22 are used for the register transfer logic (RTL) verification. The steps 10, 12, 14, 20 and 22 are used for the netlist verification.

Figure 2:
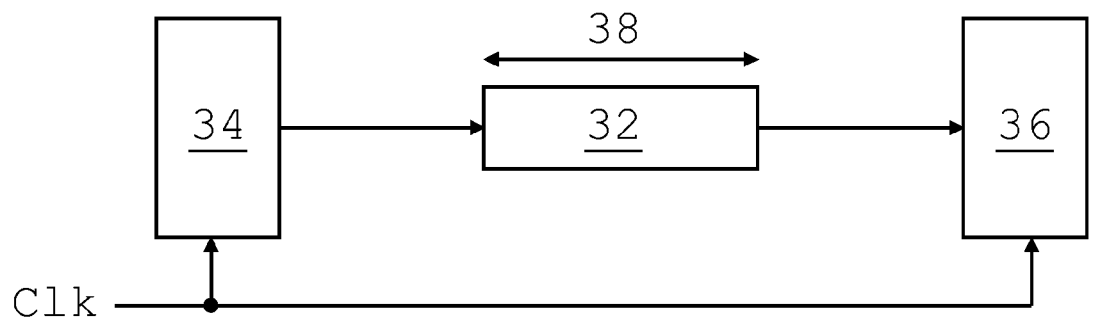
FIG. 2 illustrates a schematic diagram of a netlist for a first example according to the preferred embodiment of the present invention.

FIG. 2 illustrates a schematic diagram of a netlist for a first example according to the preferred embodiment of the present invention. A combinatorial logic circuit 32 is interconnected between a first storage element 34 and a second storage element 36. The first storage element 34 and the second storage element 36 are provided with a clock signal Clk.

The signal from the first storage element 34 via the combinatorial logic circuit 32 to the second storage element 36 has a runtime of one and a half clock cycle times. This runtime is contained in the netlist as a corresponding path delay 38.

The following table illustrates the functional timing of the storage elements 34 and 36.

|  | Clock cycle | | | | | | |
| --- | --- | --- | --- | --- | --- | --- | --- |
|  | 0 | 1 | 2 | 3 | 4 | 5 | 6 |
| First storage element | x | D1 | D1 | D2 | D2 | D3 | D3 |
| Second storage element | x | x | x | D1 | x | D2 | x |

The first line of the table contains the numbers of the clock cycles. In the second line of the table the state of the first storage element 34 is shown. The state of the second storage element 36 is shown in the third line.

Figure 3:
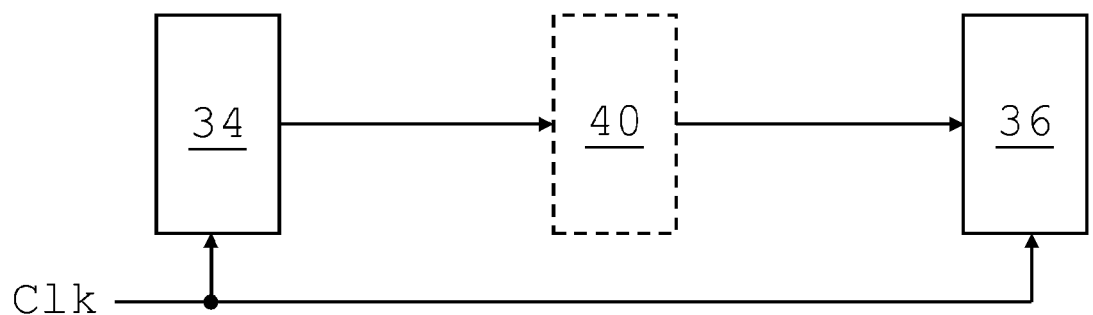
FIG. 3 illustrates a schematic diagram of a new netlist for the first example according to the preferred embodiment of the present invention.

FIG. 3 illustrates a schematic diagram of a new netlist for the first example according to the preferred embodiment of the present invention. The new netlist includes the first storage element 34 and the second storage element 36. The first storage element 34 and the second storage element 36 are interconnected via a transparent storage element 40. The storage elements 34 and 36 as well as the transparent storage element 40 are provided with the clock signal Clk. The transparent storage element 40 is only in the new netlist for the simulation process, but not in any other netlist provided for realizing the hardware.

The transparent storage element 40 causes a time delay, which corresponds with the path delay 38 of the combinatorial logic circuit 32. In this example the transparent storage element 40 causes a time delay of one clock cycle. The transparent storage element 40 is only present in the new netlist, which is modified for the verification. However, the transparent storage element 40 is not present in a netlist distinct for a physical release process.

Figure 4:
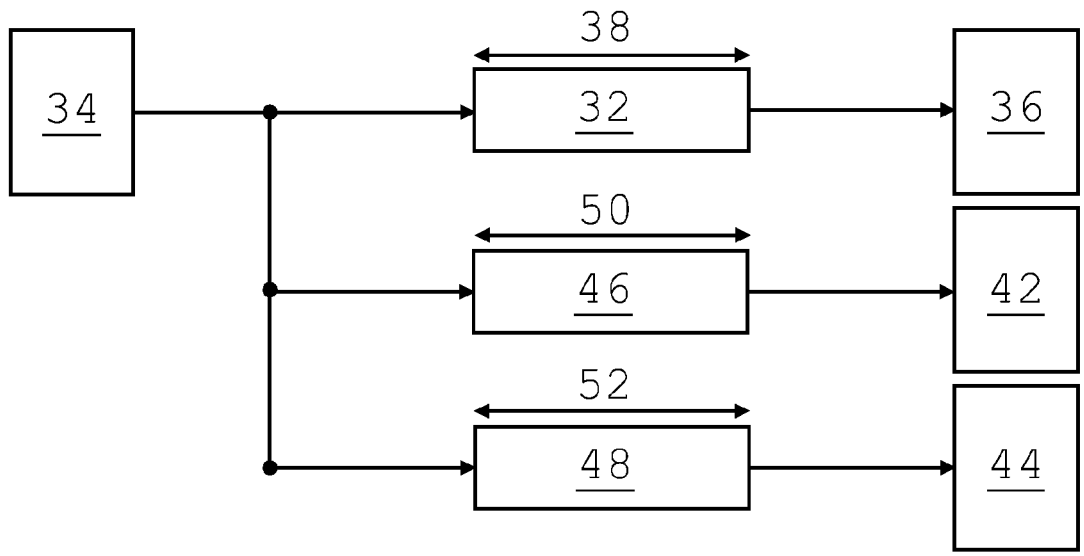
FIG. 4 illustrates a schematic diagram of a netlist for a second example according to the preferred embodiment of the present invention.

FIG. 4 illustrates a schematic diagram of a netlist for a second example of the preferred embodiment of the present invention. The second example includes the first storage element 34 and the second storage element 36. Further, the second example includes a third storage element 42 and a fourth storage element 44. The first storage element 34 and the second storage element 36 are interconnected via the first combinatorial logic circuit 32. The first storage element 34 and the third storage element 42 are interconnected via a second combinatorial logic circuit 46. The first storage element 34 and the fourth storage element 44 are interconnected via a third combinatorial logic circuit 48.

The signals from the first storage element 34 via the combinatorial logic circuits 32, 46 and 48 to the further storage elements 36, 42 and 44 have generally different runtimes. The combinatorial logic circuits 32, 46 and 48 cause corresponding path delays 38, 50 and 52, respectively.

Figure 5:
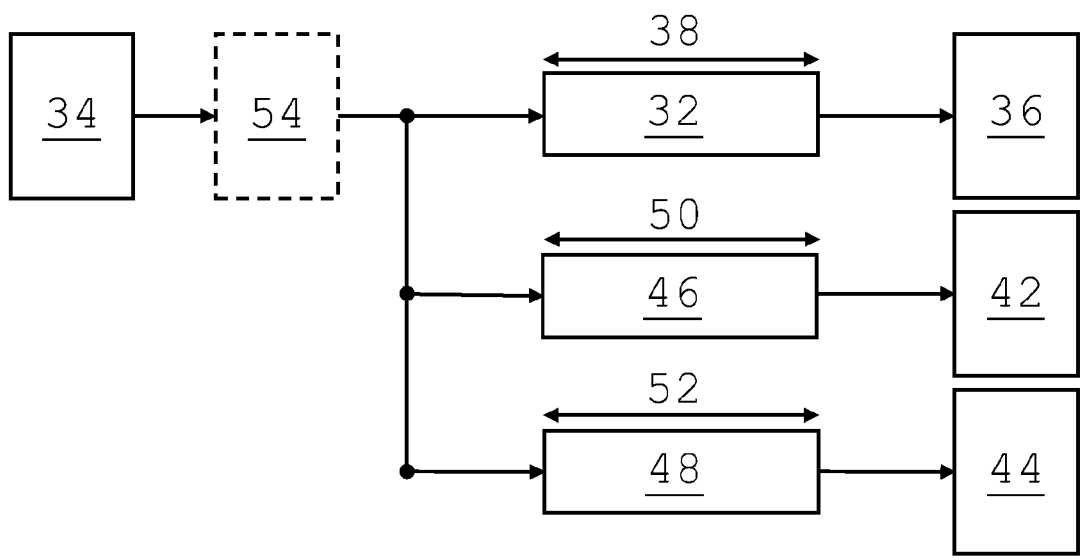
FIG. 5 illustrates a schematic diagram of a new netlist for the second example according to the preferred embodiment of the present invention.

FIG. 5 illustrates a schematic diagram of a new netlist for the second example of the preferred embodiment of the present invention. The new netlist of the second example includes the storage elements 34, 36, 42, 44 and the combinatorial logic circuits 32, 46 and 48. The storage elements 34, 36, 42, 44 and the combinatorial logic circuits 32, 46, 48 are connected together in the same way as in FIG. 4. Additionally, a transparent storage element 54 is interconnected between the first storage element 34 and the combinatorial logic circuits 32, 46 and 48.

If not all path delays are equal, then further transparent storage elements are inserted into the corresponding paths.

Figure 6:
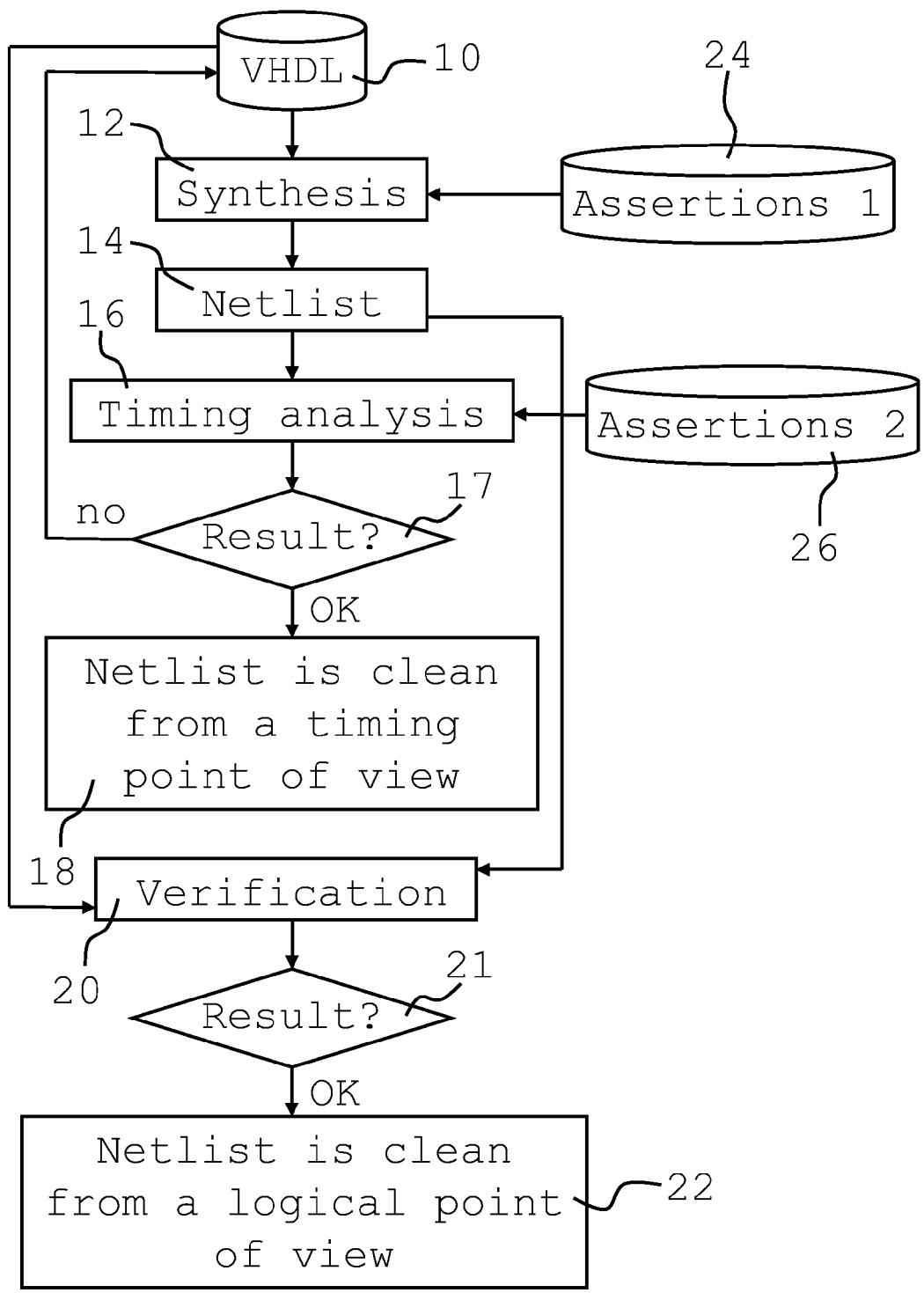
FIG. 6 illustrates a flowchart diagram of a method according to the prior art.

FIG. 6 illustrates a flowchart diagram of a method according to the prior art. Similar or identical steps have the same numbers as in FIG. 1. In the first step 10 the model of the desired digital circuit design is provided. Said model is written in a very high speed integrated circuit hardware description language (VHDL). In the second step 12 the logic synthesis is performed. By this logic synthesis the abstract form of the digital circuit design is turned into the design implementation in terms of logic gates. The logic synthesis uses first assertions 24.

In the next step 14 the netlist is created. The netlist includes the elements of the digital circuit design and the connections between said elements. In particular, the netlist contains the information of those storage elements, which are provided for the real hardware. During the step 16 the timing analysis is performed. The timing analysis uses second assertions 26. The result is checked in the step 17. If the result is not OK, then the method returns back to step 10 again. If the result is OK, then in the step 18 is shown that the netlist is clean from a timing point of view.

The steps 10, 12, 14, 16, 17 and 18 are used for the timing driven synthesis, the timing analysis and the release.

In the next step 20 the verification of the digital circuit design is performed. In the verification of step 20 the VHDL from the step 10 and the netlist from step 14 are used. The result is checked in the step 21. If the result is OK, then in the step 22 is shown that the netlist is clean from a logical point of view.

The steps 10, 12, 14, 16, 17, 18, 20, 21 and 22 are used for the register transfer logic (RTL) and netlist verification.

Unlike the method according to the present invention the new netlist with the transparent storage elements is not created. The path delays cannot be considered by this method according to the prior art.

The present invention allows that major assertions may be modeled and checked via verification. The inventive method closes the loop between timing driven synthesis, timing analysis and fast cycle based logic verification. The cell count of the released netlist is not increased by the inventive method, since the updates are done only within that netlist used for verification.

The transformation of the netlist may be automated in an easy way. On the bases of the assertion description a script generates a new verification netlist.

The inventive method is a key saving factor, since the unchecked assertion cases are reduced and the quality is therefore improved. This implies a reduced overall turn-around time with less releases.

The present invention can also be embedded in a computer program product, which comprises all the features enabling the implementation of the methods described herein. Further, when loaded in computer system, said computer program product is able to carry out these methods.

Although illustrative embodiments of the present invention have been described herein with reference to the accompanying drawings, it is to be understood that the present invention is not limited to those precise embodiments, and that various other changes and modifications may be performed therein by one skilled in the art without departing from the scope or spirit of the invention. All such changes and modifications are intended to be included within the scope of the invention as defined by the appended claims.

LIST OF REFERENCE NUMERALS

10 step of providing a VHDL
12 step of logic synthesis
14 step of creating a netlist
16 step of timing analysis
17 step of checking a first result
18 step of showing the first result
20 step of running the verification
21 step of checking a second result
22 step of showing the second result
24 step of providing first assertions
26 step of providing second assertions
28 step of providing a transformation script
30 step of providing a new netlist
32 first combinatorial logic circuit
34 first storage element
36 second storage element
38 first path delay
40 transparent storage element
42 third storage element
44 fourth storage element
46 second combinatorial logic circuit
48 third combinatorial logic circuit
50 second path delay
52 third path delay
Clk clock signal

The invention claimed is:

1. A method for validating correct logical function and timing behavior of a digital circuit design within a cycle-based verification environment, wherein said method comprises the following steps:

providing a VHDL description of the digital circuit design, performing a logic synthesis by a data processing system, wherein the VHDL description is turned into a design implementation in terms of logic gates, creating a netlist including elements of the digital circuit design and connections between said elements, providing a transformation script with at least one transparent storage element wherein said at least one transparent storage element represents a path delay within the digital circuit design, creating a new netlist from a netlist, which is clean from a timing point of view, with the at least one transparent storage element, running a verification, and checking if the new netlist is clean from a logical point of view and a timing point of view.

2. The method according to claim 1, wherein the at least one transparent storage element represents a path delay between two or more storage elements.

3. The method according to claim 1, wherein the at least one transparent storage element represents a path delay of a combinatorial logic circuit.

4. The method according to claim 1, wherein a register transfer logic (RTL) description is created in the logic synthesis.

5. The method according to claim 4, wherein a timing analysis is performed after creating the netlist.

6. The method according to claim 5, wherein the timing analysis uses assertions.

7. The method according to claim 5, wherein after the timing analysis is performed, determining if the netlist is clean from a timing point of view.

8. The method according to claim 1, wherein a netlist description is created in the logic synthesis.

9. The method according to claim 1, wherein the logic synthesis uses assertions.

10. The method according to claim 1, wherein the method is realized in a combination of hardware and software.

11. A computer program product stored on a non-transitory computer usable medium, comprising a computer readable program means for causing a computer to implement a method according to claim 1.

12. An apparatus for validating correct logical function and timing behavior of a digital circuit design within a cycle-based verification environment, wherein said apparatus comprises:

means for providing a VHDL description of the digital circuit design, means for performing a logic synthesis by a data processing system, wherein the VHDL description is turned into a design implementation in terms of logic gates, means for creating a netlist including elements of the digital circuit design and connections between said elements, means for providing a transformation script with at least one transparent storage element, wherein said at least one transparent storage element represents a path delay within the digital circuit design, means for creating a new netlist from a netlist, which is clean from a timing point of view, with the at least one transparent storage element, means for running a verification, and means for checking if the new netlist is clean from a logical point of view and a timing point of view.

* * * * *